Aug. 4, 1959     A. NERGAARD     2,897,891
VALVE FOR WATER SOFTENING
Filed March 10, 1953     5 Sheets-Sheet 5
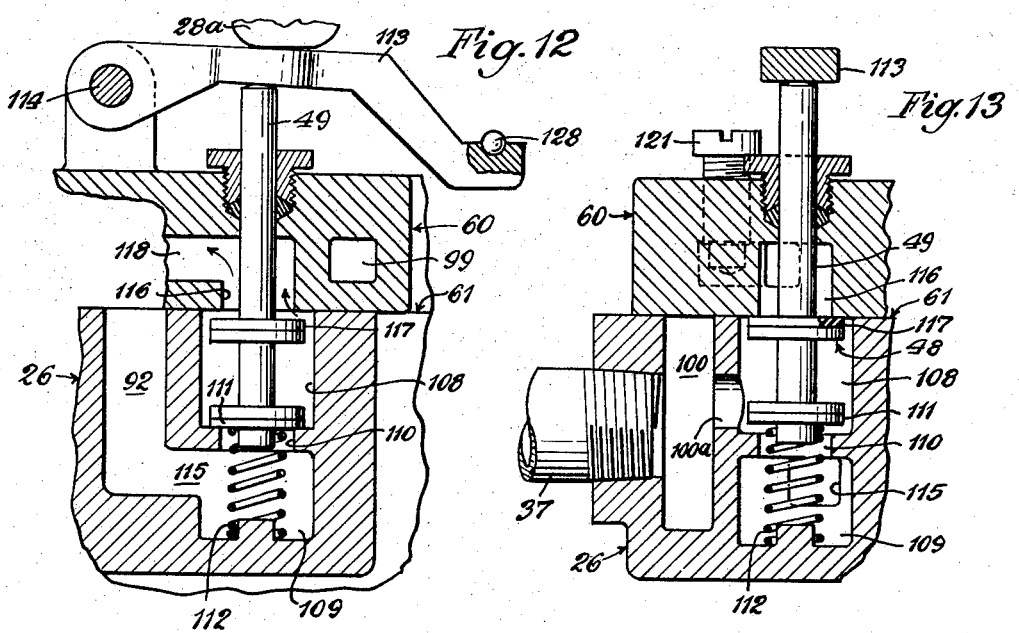
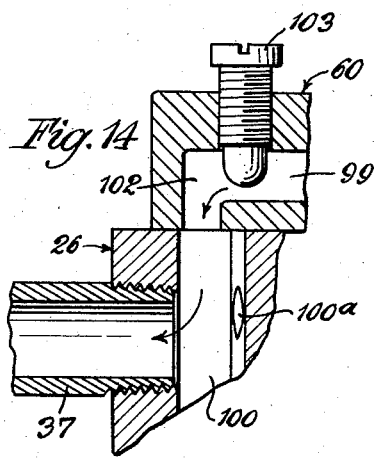
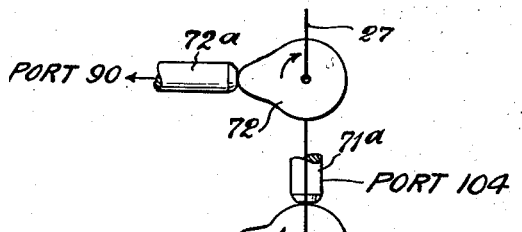
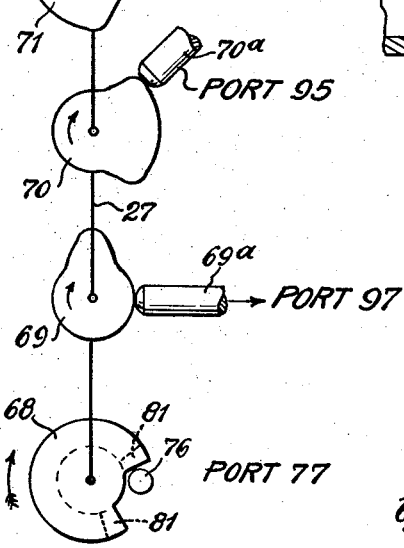
Inventor
Arnold Nergaard
by W. Bartlett Jones,
Attorney United States Patent Office 2,897,891
Patented Aug. 4, 1959

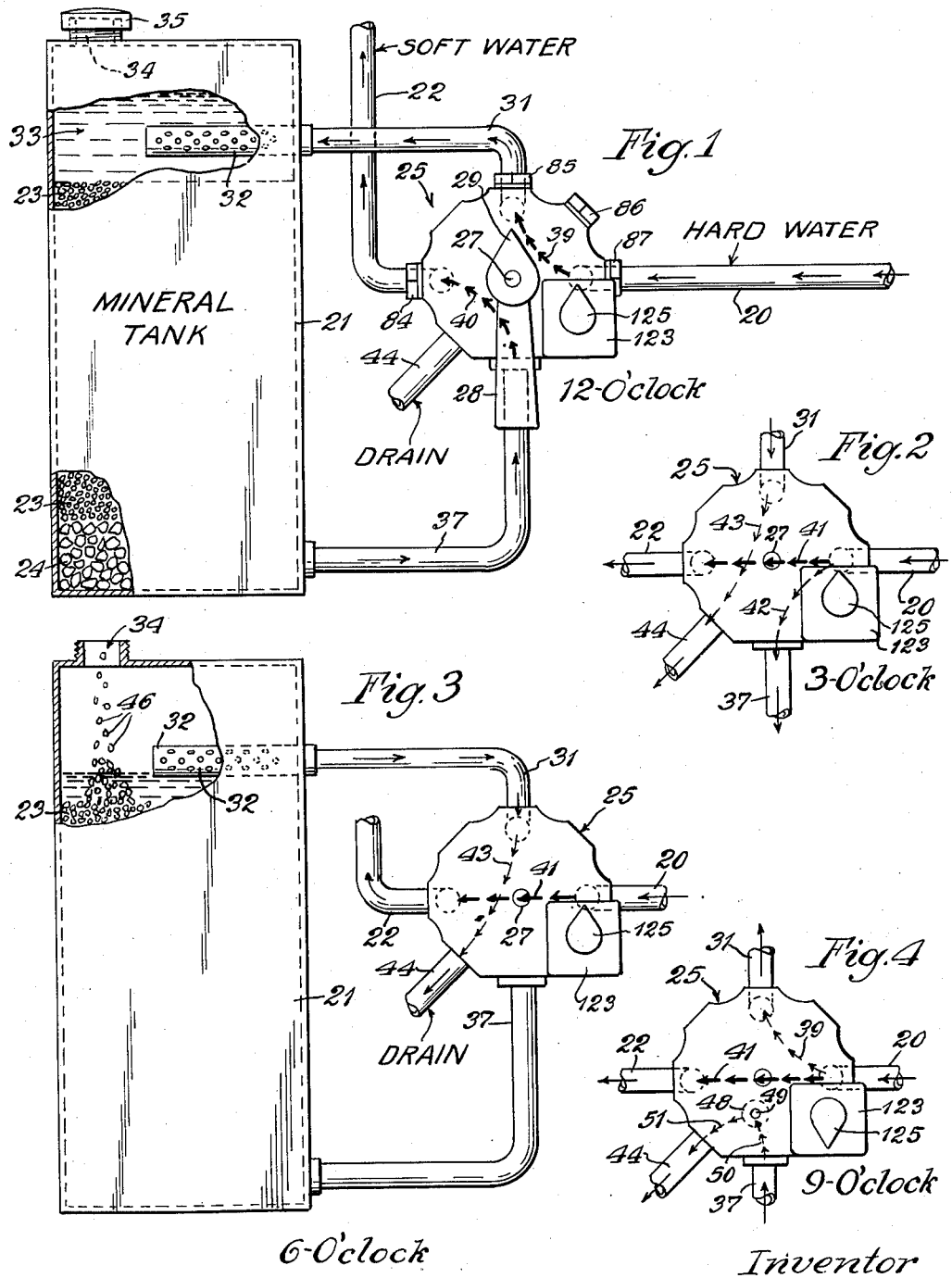

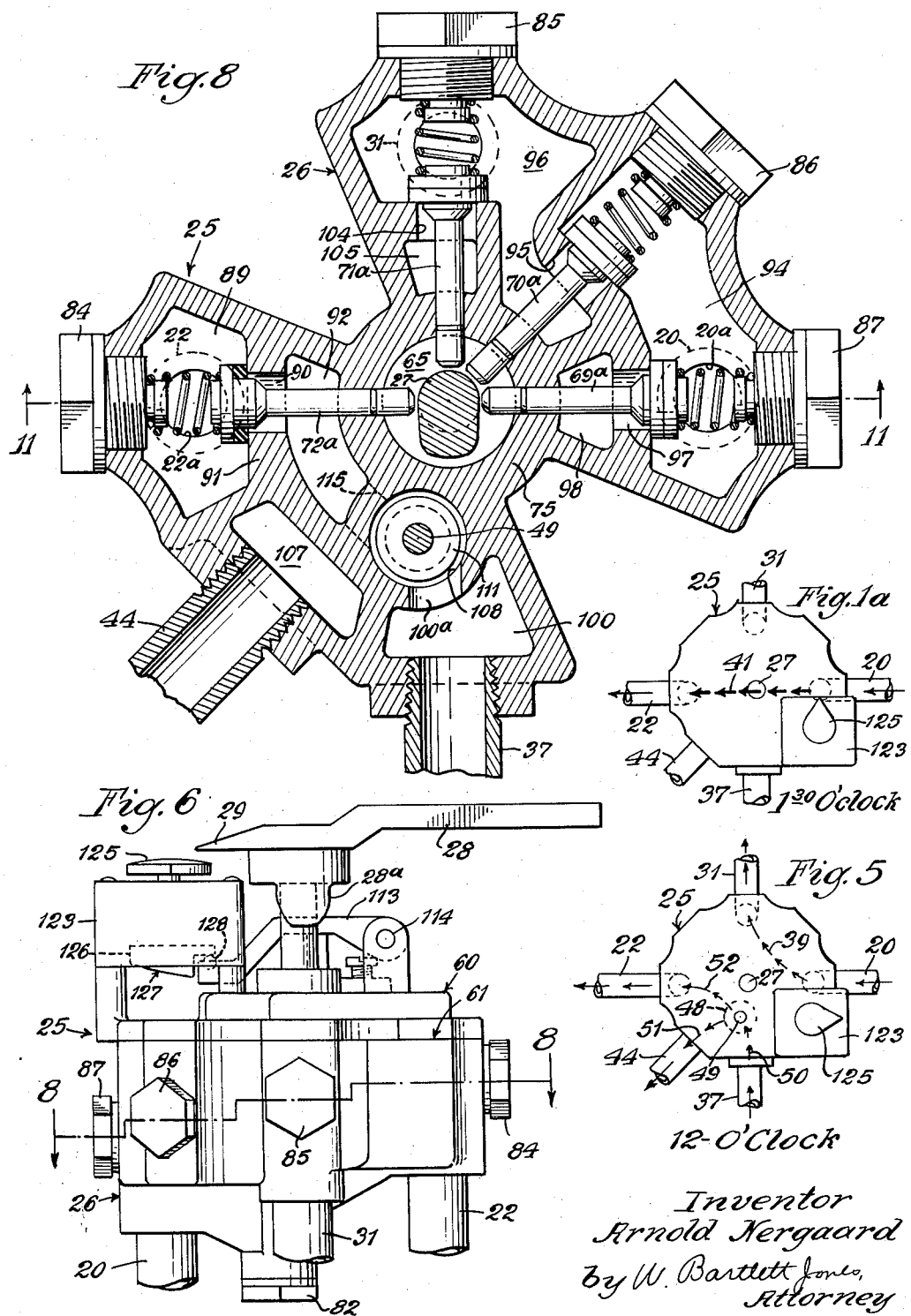

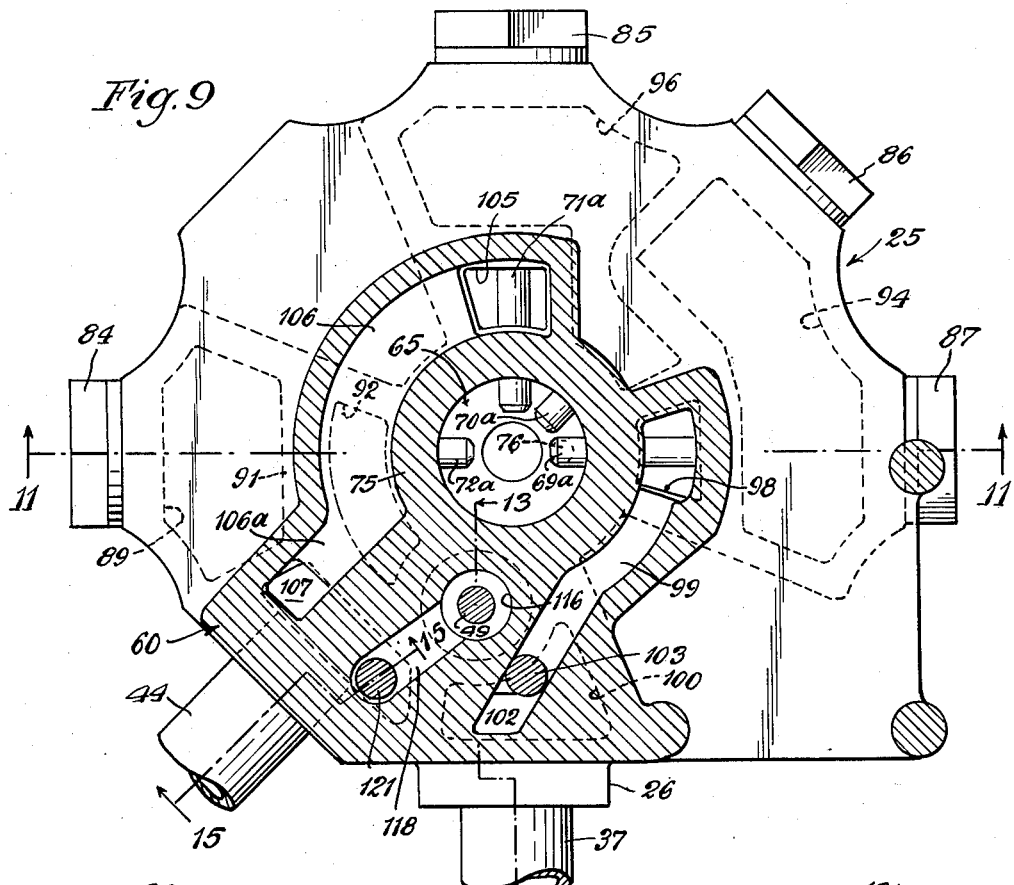

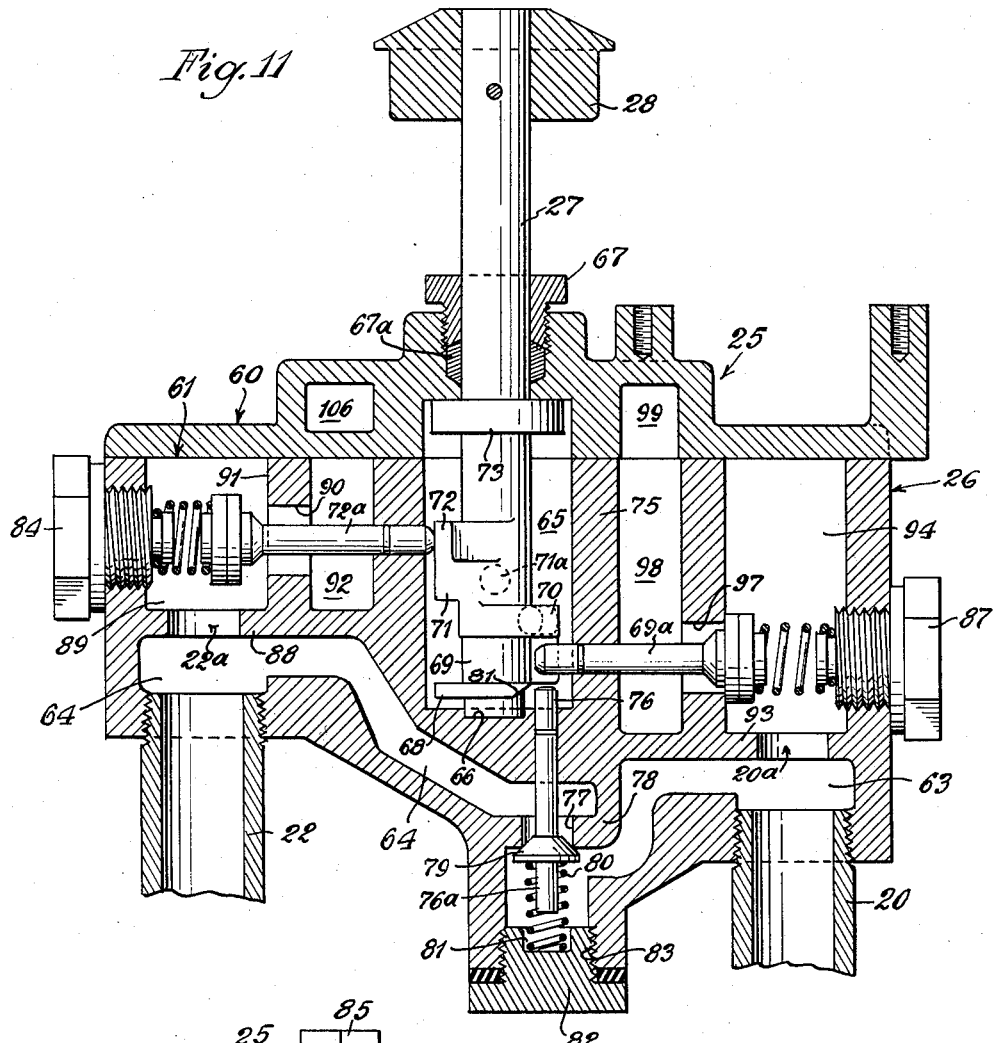

2,897,891

VALVE FOR WATER SOFTENING

Arnold Nergaard, St. Charles, Ill., assignor to Clayton Mark & Company, Evanston, Ill., a corporation of Delaware Application March 10, 1953, Serial No. 341,585

5 Claims. (Cl. 161—7)

The present invention relates generally to water-softening by the regenerative base-exchange process, and in particular to a novel valve construction which facilitates the regeneration of the base-exchange material, which permits the use of water in the normal way during the regenerative action, and which has numerous other advantages.

In the base-exchange process there is a bed of solid material, such as the mineral zeolite, or synthetic minerals of like action, or certain synthetic resin-mineral materials, through which the hard water passes. The bed material exchanges cations of its composition for those cations of the hardness elements dissolved in the water. The conventional base-exchange materials have exchangeable sodium ions as components of their chemical composition. The common cations which make water hard or undesirable for domestic use, are calcium, magnesium, ferrous iron and ferric iron. The bed material assimilates these cations from the water and yields its sodium ions to the water.

The process is reversible by shifting the greater concentration of cations to the other side. A new bed has a limited capacity for softening water, so that in time it becomes exhausted in sodium ions for delivery to the water. If the water passing through the bed is made to carry a heavy concentration of sodium ions, the bed will assimilate sodium ions and yield to the water those calcium, magnesium and iron cations which it has previously assimilated. As a result, an exhausted or weakened bed is regenerated by subjecting it to contact with a sodium chloride brine, and then rinsing from the bed the residual brine containing any chlorides of calcium, magnesium or iron formed in the regeneration.

Many homes throughout the country are equipped with water-softening tanks, and regenerating equipment, the operation of which appears to some people as a major engineering task. Service companies exist which periodically attend to the regeneration for a fee, which may be saved by the occupant by use of the present invention.

It is an object of the present invention to provide apparatus controlling the various flows of liquid for regeneration, which is simple to operate, which may be simply operated manually by timing or be automatically timed and operated, and which permits the normal use of water from the system during regeneration.

It is a particular object of the invention to provide a master valve unit through which all connections are made in proper sequence during one revolution of a single valve stem.

It is a particular object of the invention to provide and locate a valve with reference to the softening tank so that in one position it will operate to drain the tank to a limited extent and thereby provide a space to receive solid sodium chloride through a suitable opening in the tank.

It is a particular object of the invention to provide a clock-operated valve member having a timing connection with the valve such that the connection resists a valve-operating force originating in the valve.

It is also an object of the invention to provide a valve which is manually operated to all the positions of its main valve stem, and which has a secondary valve member operated by a time clock for the final action of a cycle.

It is a particular object of the invention to provide a valve which restores the system to softening operation at a time when rinsing is incomplete, and to continue rinsing for a predetermined time thereafter which may be terminated automatically by a clock mechanism.

It is also an object of the invention to provide a valve which may be moved from normal softening position to another of its cycle positions, for the purpose of by-passing the softening tank to deliver unsoftened water to the consumption line.

Various other and ancillary objects and advantages of the invention will appear from the following description and explanation of the invention, in connection with the accompanying drawings of a presently preferred embodiment thereof, in which:

Fig. 1 is a general view of the valve as connected to the softening tank, the water supply and the consumption line, including location of the valve below the top for partial draining of the tank, and including a diagrammatic representation of the functioning channels on the valve during normal softening operation.

Fig. 1ᵃ is a view similar to Fig. 2 showing an optional position of the valve to by-pass the tank for use of unsoftened water.

Fig. 2 is a general assembly view of the valve similar to that in Fig. 1 showing the channels through the valve in the position thereof for back-wash.

Fig. 3 is a view similar to that in Fig. 1 showing the channels through the valve during partial draining to provide a salt-receiving space in the tank.

Fig. 4 is a view similar to that in Fig. 2 showing channels through the valve in the brining position thereof, which includes the beginning of the rinsing stage.

Fig. 5 is a view similar to that in Fig. 2 showing the channels through the valve in the final portion of the rinsing stage which includes a channel for delivery of softened water, as in Fig. 1.

Fig. 6 is a view of the side of the valve which is uppermost in Fig. 1; however, with the valve handle turned to the 3-o'clock position.

Fig. 7 is a view of the valve looking at the side opposite that shown in Fig. 6.

Fig. 8 is a horizontal cross section of the valve taken on line 8—8 of Figs. 6 and 7.

Fig. 9 is a cross section of the top cap of the valve taken on the line 9—9 of Fig. 7.

Fig. 10 is a view of the top of the valve as seen in looking downward in the position of Fig. 7.

Fig. 11 is a vertical cross section of the valve taken on the line 11—11 of Figs. 8 and 9.

Fig. 12 is a detailed fragmentary and enlarged cross section taken on the line 12—12 of Fig. 10 showing the clock-controlled valve member.

Fig. 13 is a detailed fragmentary and enlarged cross section taken on the line 13—13 of Fig. 9 showing the clock-controlled valve member looking at a right angle to the position in Fig. 12.

Fig. 14 is a detailed fragmentary and enlarged cross section taken on the line 14—14 of Fig. 10 showing an adjusting screw for flow in back-washing.

Fig. 15 is a fragmentary cross section on line 15—15 of Fig. 9 showing an adjusting screw for flow in rinsing.

Fig. 16 is a schematic positional illustration of the valve-stem cams and their valve members in the position of Fig. 1.

In the drawings there is a representative water-softening system equipped with a multiple valve structure which presents a rotary valve stem, indicated in Fig. 1 as extending horizontally, and arranged for a sequence or cycle of operations or positions in one revolution of the stem. As illustrated, the valve is designed for four functional positions of the valve stem, which are indicated as the 12-o'clock position in Fig. 1, for normal softening operation; as the 3-o'clock position in Fig. 2, for back-washing prior to regeneration; as the 6-o'clock position in Fig. 3, for draining the top of the tank in preparation for adding solid sodium chloride through an opened receiving hole; as the 9-o'clock position in Fig. 4, for brining and rinsing; and finally back to the original 12-o'clock position in Fig. 5 in which position there is a secondary valve member, preferably controlled by a time clock to shut off a draining connection through which rinsing is continued, preferably by said clock control.

These general objectives and over-all functions are first explained by reference to schematic Figs. 1 through 5, and then will follow a description of a suitable valve construction to effect said functions.

Fig. 1 shows a main supply 20 of hard water, a water softening tank 21, and a soft-water consumption line 22, for water from supply 20 after it has passed through a bed 23 of zeolite or other suitable base-exchange material, placed above a retaining bed of gravel 24. All connections are made through valve 25 of the present invention.

Valve 25 is shown for convenience as having a casing 26 of generally octagonal form, a central valve stem 27 (horizontal in Fig. 1), and a valve handle 28 having pointer 29. Various pipe connections are indicated as made to the valve at several places. At the 3-o'clock side (referred to Fig. 1), the hard water pipe 20 is connected. In normal softening operation hard water leaves valve 25 at the 12-o'clock position via pipe 31 entering the tank 21 at a short distance below the top. The end of the pipe 31 at the tank side is extended into the tank by an elongated water-distributor 32 located above the top of bed 23 and in open space 33 at the top of the tank. An opening 34 at the top of the tank is normally closed by a sealing cap 35, which is removed to permit introduction of solid sodium chloride for regeneration.

Softened water leaves the bottom of tank 21 via pipe 37 connected into the valve 25 at its 6-o'clock position, and leaves the valve via said pipe 22 for consumption.

*Softening at 12-o'clock position.*—With the valve pointer 29 at 12-o'clock as in Fig. 1, the valve 25 establishes through it a channel 39 from supply line 20 to tank feed pipe 31, and a channel 40 from tank outlet pipe 37 to consumption pipe 22. This normal position is maintained until it is desired to, or time to, regenerate the bed 23, except for the privilege of turning the valve to the 9-o'clock position to by-pass the softening operation, for example to use a large volume of hard water through the consumption line as in watering a lawn or garden. When regeneration is in order, the valve pointer 29 is turned to the next functioning position, namely, the 3-o'clock position.

*Back-wash at 3-o'clock position.*—In Fig. 2 the valve pointer 29 has been moved to its 3-o'clock position to close channels 39 and 40 and to establish a reverse flow in the tank 21 as a flushing operation to carry back and discharge as waste any filtered impurities collected by the bed in normal operation; and also to provide water in the consumption line 22 by establishing a direct channel 41 in the valve from supply pipe 20 to the consumption line 22. It also establishes a flushing channel 42 in the valve from supply pipe 20 to the tank bottom via pipe 37, thus to reverse flow in the tank 21. The valve 25 also establishes a channel 43 from the top of tank via pipe 31 to a discharge drain pipe 44 connected to the valve casing 26 at its 7:30-o'clock side. In this position, back-washing flow continues so long as the handle is in its 3-o'clock position, and it is then stopped by moving to the 6-o'clock position.

*Draining at 6-o'clock position.*—When the handle has its pointer 29 at the 6-o'clock position of Fig. 3, the channel 41 is maintained to pass hard water from the supply pipe 20 to the consumption line 22; and the only additional channel through the valve is one designated 43 connecting pipe 31 to the drain pipe 44. The tank 21 is thus cut off from pressure and is connected from its top to the atmosphere via pipe 31, channel 43 and drain pipe 44. The cap 35 is absent in Fig. 3 exposing the opening 34. Removal of the cap admits air and lowers the water level to the distributor 32. Salt 46 is illustrated as being introduced after the drainage is completed. Then the opening 34 is recapped and the brining begun by turning the valve handle to its 9-o'clock position of Fig. 4.

*Brining-rinsing at 9-o'clock position.*—The by-pass channel 41 is retained, channel 43 of Fig. 3 is closed, channel 39 of Fig. 1 is re-established, and a new channel is formed connecting tank-bottom pipe 37 and the drain pipe 44. This new channel is in two parts through a secondary valve structure schematically indicated at 48 having controlling valve stem 49 later described. The said new channel has its beginning as channel 50 from pipe 37 to secondary valve 48, and continues as channel 51 from valve 48 to the drain pipe 44. Thus, hard water flows into the top of the tank, slowly by means of an adjustment later described, dissolves the salt 46, carries it down through the bed to regenerate it, out via pipe 37, through valve 25 via channels 50—51 to the waste pipe 44. When all the salt is dissolved, hard water follows as a rinsing operation removing residual salt solution and its gathered hardness chlorides.

*Time-controlled rinsing at 12-o'clock position.*—The rinsing flow in Fig. 4 at the 9-o'clock position may be continued as long as desired, and may be stopped by operating secondary valve 48 to close channel 50—51. This closure may be effected in either the 9-o'clock position of Fig. 4 or the 12-o'clock position (Fig. 1). When effected in the 9-o'clock position, the softening tank is by-passed.

The secondary valve 48 has a chamber always open to pipe 37, which chamber discharges in one or both of two directions. Its plunger type valve stem 49 has two extreme positions and all intermediate positions. In one extreme it establishes said channel 51 from its chamber to the drain. In its other extreme position it closes said channel 51 and maintains channel 52 from its chamber to consumption pipe 22. In its intermediate positions (see Fig. 5) the channel 50 (or pipe 37) connects through the secondary valve 48 with drain 44 via channel 51 and with consumption line 22 via channel 52. The said last connection 50-valve 48—52 is the channel 40 in Fig. 1 and may be opened only in the 12-o'clock position.

With the valve 48 in its intermediate positions to establish the channels 50, 51 and 52 of Fig. 5, the tank 21 is being slowly rinsed, yet water from the tank may be consumed in a normal manner, bearing what trace of brine may be present.

It is a feature of the present invention that the secondary valve 48 moves slowly to that extreme position which cuts communication to the drain. This is accomplished by a time clock which is set to run for any desired period of time in a limited range, for example from 20 minutes to 2 hours. In so controlling the valve stem 49 by a clock, the stem is moved toward its other extreme position in extent proportional to the time selected for effecting cut off to the drain. Means for this is later described.

The advantage to the household lies in the fact that adequate rinsing requires a slow flow over a period of time. By the present time-controlled valve, the householder may effect the final movement of the main valve stem from brining at the 9-o'clock position to the normal utility 12-o'clock position, and at the same time set the clock to continue rinsing for a selected period of time, at the end of which the regeneration cycle is automatically completed. For example, such a move from Fig. 4 to Fig. 5 may be made just before retiring, and the clock will permit rinsing for a selected time, and then stop the rinsing, without altering the conventional channel for use of softened water.

However, the utility of the valve does not depend wholly upon the clock. Optional means may be used to substitute for the clock, when desired, or when necessary because of clock failure. As mentioned, the valve stem 49 has two extreme positions, but under clock control it is in intermediate position, with the clock timing the movement to that extreme position cutting off the drain through pipe 44. By providing means operable in the 9-o'clock position, to substitute for the clock to position of valve stem 49, additional advantages are achieved. As will be described later, such optional means may be a cam on the handle 28.

Two handles 28 may be supplied, one with such a cam and one without. To accommodate the valve for one of its uses, that is, positioning it to use unsoftened water without any reference to regeneration, there is a 1:30-o'clock position shown in Fig. 1a, which effects a by-pass of the tank through the valve prior to the valve entering and passing the 3-o'clock position for the regenerating cycle. The said 1:30 o'clock position is optional, and in the event that the said optional cam on the handle is not provided, the 9-o'clock position is likewise effective to by-pass the tank when the clock has functioned to close the drain.

The valve for accomplishing the foregoing operations may assume various forms. For simplicity of construction and maintenance it has a cast casing of two parts, a main rotary operating valve stem 27 on which are mounted a series of cams for a series of internal valves, having radially disposed valve members operated by the cams to open and close valve ports between separate chambers within the valve casing. The several chambers are connected to the various pipes already described and to each other by overpasses and channels. The two-part casing consists of the main open-faced casing 26 and a cap or closure 60 therefor best viewed in Figs. 7 and 11. The interface between the two parts is designated 61, representing also a gasket if the parts are not otherwise sufficiently tight when united by bolts (not shown).

The casing parts 26 and 60 have chambers and channels variously cast and machined in the parts, many of them in one part opening at the interface 61 for interconnection with or closure by the other part.

By reason of the existence of the chambers there are internal partitions between chambers and these are formed generally as walls concentric with the valve stem 27. To simplify the description, the chambers rather than the walls will be referred to.

The casing 26 from its exterior is provided with radially directed access openings of moderately large size, which are threaded for removable screw plug closures. Through these access openings the said concentric walls are drilled to provide both valve ports between chambers and bearing holes for valve stems. Also, through the access openings the valve members are inserted and mounted, in a manner to permit easy removal and replacement, and also in a manner to permit each valve member to be yieldingly moved by a cam on the main valve stem 27 to open and close its port.

In the valve as positioned with the axis of its handle 28 in horizontal position (see Figs. 6 and 7) the pipes 20, 22 and 31 enter at the bottom, and the pipes 37 and 44 enter at the side.

Fig. 11 shows pipes 20 and 22 communicating in casing 26 respectively with hard water chamber 63 and normal soft-water chamber 64.

The two casing parts 26 and 60 together provide a cam chamber 65, at the bottom of which (Fig. 11) main valve stem 27 bears in a recess bearing 66. A packing nut 67 for packing 67a in casing cap 60 closes the cam chamber against leakage outwardly. In Fig. 11 there are shown alined in and rigid with valve stem 27 a series of five cams designated upwardly 68 to 72 inclusive, and above them a bearing flange 73 (see also Fig. 16) to bear against the casing cover 60 at interface 61. The wall defining the cam chamber 65 is designated 75, and at regions opposite the cams, except lowermost cam 68, there are four radial bearing holes for four radial valve stems showing in Fig. 9, wherein the cams and valve stem are omitted.

Cam 68 in Fig. 11 functions to open and close a channel from hard water supply pipe 20 to consumption line 22, by moving vertical valve stem 76 to open and close a port 77 in wall 78 between said chambers 63 and 64. Valve stem 76 carries a valve head 79 seating over port 78 to close it. The stem 76 extends as a stub 76a beyond the head 79 to receive around it one end of a coiled compression spring 80 of which the other end seats in a recess 81 in a screw plug 82 closing access opening 83 at the bottom of casing 26. Cam 68 has a portion of its face beveled as shown at 81 to open port 77 by action on stem 76 against spring 80. Thus, the channel 41 (open port 77) is established as in Figs. 2, 3 and 4 to provide to the consumption line 22 unsoftened water from pipe 20.

The descriptions of plug 82 for closing its access opening 83 into the casing 26, of the spring 80, and of the valve member 76—79—76a just within the access port, are sufficient for four similar structures around the casing 26 for which the locations are indicated by numerals 84 through 87 designating the closure plugs, for valves 72a, 71a, 70a and 69a in the clockwise direction in Fig. 8, the numbers corresponding to their cams (see Fig. 16).

In Fig. 11 just over pipe 22 and over the hard water chamber 64 there is a circular port 22a in wall 88 connecting chamber 64 with a chamber 89 in which there is opposite plug location 84 a valve member (including head and stem) 72a for cam 72, to open and close port 90 in wall 91 between chambers 89 and 92. Port 90 lies in channel 40 in Fig. 1.

In Fig. 11 hard water entering via pipe 20 passes upwardly in casing 26 through a part 20a in a wall 93 to a chamber 94. Chamber 94 is open at interface 61 and closed by cover casing 60. For chamber 94 there are two valves 69a and 70a. Valve 70a controls port 95 entering chamber 96, in the bottom of which enters the pipe 31 which leads to the top of the tank 21. Accordingly port 95 corresponding to channel 39 in Fig. 1 is normally open when port 90 is open for delivering softened water. These cam-opened positions are shown in Fig. 16.

When the 3-o'clock position of Fig. 2 functions, the ports 90 and 95 at locations 84 and 86 are closed by the cams 72 and 70, respectively, and the port 77 is opened by the bottom cam 68, opening the by-pass channel 41. For the channel 42 from supply pipe 20 to pipe 37, the valve 69a at plug location 87 is operative to open port 97 between hard water chamber 94 and a chamber 98. Chamber 98 opens upwardly to interface 61 where it communicates with a channel 99 (see Fig. 9) in the casing cap 60. Channel 99 extends toward the location of pipe 37 which leads into a chamber 100 (Fig. 8). The cap 60 in part closes the top of chamber 100, a small unclosed part opening into the end of channel 99 as shown by the open area 102 in Fig. 9, and in cross section in Fig. 14. To control the flow in overpass 99 there is an adjusting screw 103 from the top of the cap 60. The flow from chamber 94 through channel 99 to chamber 100 corresponds to the channel 42 in Fig. 2.

But also, channel 43 in Fig. 2 must be open to connect pipe 31 to drain pipe 44. Valve 71a at plug location 85 opens port 104 to chamber 105 connecting it with chamber 96 and pipe 31. Chamber 96 is closed at the interface 61 by the bottom wall of the cap casing 60, but chamber 105 opens into cap casing 61 and to channel 106 therein (see Figs. 9 and 11). Channel 106 curves around the axis and has a terminal radial extension 106a which opens into a portion of the top of drain chamber 107 into which drain pipe 44 leads. Thus, open port 104 corresponds to channel 43 of Fig. 2.

For the 6-o'clock position of Fig. 3 the tank is opened and water drains by gravity through channel 43, which remains open by action of cam 71.

In the 9-o'clock position the cam 71 closes channel 43 and re-establishes channel 39 to the tank to dissolve salt. To drain the flow of salt water via the pipe 37 entering chamber 100, there is an open port 100a from chamber 100 into the chamber 108 of the secondary valve 48, the function of which is best explained by first describing it in detail.

The secondary valve 48 is shown in Figs. 12 and 13. Under the main valve chamber 108 is another chamber 109 and between them a port 110 which may be closed by a valve member 111 on stem 49. Stem 49 projects into chamber 109 within a compression spring 112 seated in the bottom of chamber 109 to force the valve stem upwardly against a hold-down lever 113, pivoted at 114 at the top of the casing 60 for vertical swinging. The bottom chamber 109 connects with chamber 92 (see Fig. 11) by an open port 115.

The top of valve chamber 108 in casing 26 is closed in part at the interface 61 by the casing cap 60 by the area around a port 116 in the cap 60, against which seats a second valve member 117 on valve stem 49. The valve members 111 and 117, are arranged so that one seats when the other is unseated, and so that both may be unseated at intermediate positions. Upper port 116 opens into a channel 118 in the cap which has a small port 120 opening from it into the top of drain chamber 107. Over the port 120 is a flow-control adjusting screw 121 at the top of casing 60. See Fig. 15.

Valve stem 49 is normally urged upward to close port 116 leading to the drain chamber 107. To open port 116, the hold-down lever 113 is depressed against spring 112. Means to depress the lever 113 is preferably a time-control which gradually allows the spring 112 to exert its force.

There is a spring-controlled clockwork 123 shown in outline only, having a main shaft 124 rotatable by spring 123A and at the top of which is a winding handle 125 to be turned for any number of minutes of operation. At the other end of main shaft 124 is a rotary cam 126 the face of which has a cam incline 127. In setting the clock, the cam acts on a bearing ball 128 in the top of hold-down lever 113 to depress the valve stem 49. As the clock unwinds the cam allows the valve to rise and to be seated over port 116 by spring 112. It is preferred that the face of cam 126 be free from level inactive areas and be inclined when functioning, so that the upward force of valve stem 49 aids the cam in its direction of rotation. In other words, the cam resists the normal tendency of the valve stem to rise. Further, to lessen the effort of the clockwork, the cam 126 has a ball bearing 129, against an overlying frame plate 130.

When the valve stem 49 is depressed to close port 110, no water from the tank via pipe 37 can pass into chamber 92, from which it flows through cam-valved port 90 into softened water chamber 89 for ultimate use. Thus, by mechanically lowering valve stem 49 to its limit, one may open access plug 84 for cleaning or repair, with the valve in 12-o'clock position.

Otherwise and during normal control by the clock cam 126 the valve stem 49 is in intermediate position, permitting flow from pipe 37 (bottom of tank) to the consumption line 22 (channel 50—52 of Fig. 5) and flow from said pipe 37 to the drain via upper port 116 (channel 51 of Fig. 5). When the clock permits valve 48 to close in upper position the draining is cut off, leaving the open channel 50—52 of Fig. 5 which in the valve 26 is chamber 100, port 100a, valve chamber 108, lower port 110, chamber 109, port 115, chamber 92, cam-opened port 90, and chamber 89.

Because the clock is intended to perform its timing function with the valve in 12-o'clock position, there may be used a mechanical means other than the clock to depress valve stem 49. Such means is shown as a cam 28a on the underside of handle 28 in position to depress lever 113 to move valve stem 49 to its lowermost position closing port 110 at the 9-o'clock position of the valve. By extending cam 28a so that at the 10:30-o'clock position the valve stem 49 continues to close port 110 while the clock is working or not, the access plug 84 may be opened for cleaning or repair with the valve in the 10:30-o'clock position. Since rinsing extends from the 9-o'clock to the 12-o'clock positions with the clock running, the said repair work may be done while rinsing with the valve at the 10:30-o'clock position.

The following Table I is a summary of parts and actions, which enables one to follow the action by reference to the drawings.

TABLE I

| Fig. | Action | Channel | At plug location | open port | permits flow of | from chamber | to chamber | for delivery to— |
|---|---|---|---|---|---|---|---|---|
| 1 | Softening | 39 | 86 | 95 | hard water | 63–94 | 96 | top of tank 21. |
|  |  | 40 | 84 | 90 | softened water | 100 via valve 48, port 115, and chamber 92. | 89 | use pipe 22. |
| 1a | Sprinkling (Optional). | 41 | 82 | 77 | hard water | 63 via 64 | 89 | use pipe 22. |
| 2 | Backwash | 41 | 82 | 77 | ___do___ | 63 via 64 | 89 | use pipe 22. |
|  |  | 42 | 87 | 97 | ___do___ | 63–94 via 98–99 L–102.[1] | 100 | bottom of tank. |
|  |  | 43 | 85 | 104 | back-washed water from top of tank. | 96 via 105–106 L–106a.[1] | 107 | drain 44. |
| 3 | Drain | 41 | 82 | 77 | hard water | 63 via 64 | 89 | use pipe 22. |
|  |  | 43 | 85 | 104 | back-washed water above level pipe 31. | 96 via 105–106 L–106a.[1] | 107 | drain 44. |
| 4 | Salt then rinse | 41 | 82 | 77 | hard water | 63 via 64 | 89 | use pipe 22. |
|  |  | 39 | 86 | 95 | ___do___ | 63–94 | 96 | top of tank 21. |
|  |  | 50–51 | (valve 48) | 116 | salty water and rinse tailings. | 100 via 100a–108–116–118–120. | 107 | drain 44. |
|  | Optional 10:30 o'clock repair rinse. | 39 | 86 | 95 | hard water | 63–94 | 96 | top of tank 21. |
|  |  | 50–51 | (valve 48) | 116 | salty water and rinse tailings. | 100 via 100a–108–116–118–120. | 107 | drain 44. |
| 5 on clock | Rinse and soften | 39 | 86 | 95 | hard water | 63–94 | 96 | top of tank 21. |
|  |  | 50–51 | (valve 48) | 116 | rinse water | 100 via 100a–108–116–118–120. | 107 | drain 44. |
|  |  | [2] 50–52 | 84 | 90 | softened water and rinse tailings. | 100 via 100a–108–115–92. | 89 | use pipe 22. |

[1] Overpass in cover cap 60.
[2] Same as channel 40 in Fig. 1.

From Table I, from the vertical alinement of Fig. 11, and from the radial arrangement of Fig. 8, the following Table II is derived, giving under "Cam" the downward vertical (Fig. 11) order of the cams, giving under "Location" the designation of the access plugs and hence the radial direction of valve action, and giving under Figs. 1 through 5 the identification of port which is open at the position of the given "Figure."

To simplify a description of the cams as related to their valve members, Fig. 16 is given schematically. Valve stem 27 is represented by a vertical line. The cams therein are shown turned to 90° to lie in the plane of the drawing, each in the position of Fig. 1, if viewed individually along the axis of stem 27. The valve members actuated by the cams are illustrated in their normal radial positions with reference to the centers of their cams, and they are identified by a legend naming the port opened by each.

Fig. 16 is read in connection with the following Table II.

TABLE II

*Ports open*

| Cam | Location | Fig. 1 | Fig 1 a | Fig. 2 | Fig. 3 | Fig. 4 | Fig. 5 |
|---|---|---|---|---|---|---|---|
| 72 | 84 | 90 | | | | | 90 |
| 71 | 85 | | | 104 | 104 | | |
| 70 | 86 | 95 | | | | 95 | 95 |
| 69 | 87 | | | 97 | | | |
| 68 | 82 | | 77 | 77 | 77 | 77 | |

It is to be understood that the valve unit may have other forms, and that the pockets need not be arranged in the relationship one to another as shown. By reason of the two part construction illustrated, the main casing 26 is cast with chambers or pockets therein opening at the interface 61. The cap section 60 fitting section 26 at said interface provides walls and channels variously serving to close in whole or in part one or more pockets in section 26 and also to interconnect pockets in section 26 by overpass channels. It will be appreciated that these functions of the cap section 60 may be divided into two modified caps for two interfaces (like interface 61) presented by a suitably modified main casing 26. The inner axial valve members and their operating cams may be variously positioned relative to the main valve stem 27, a radial position being used in seven instances and a different position being exemplified by the valve member 76 which by-passes hard water through the valve in all clock positions except normal water-softening position in Fig. 1.

From the foregoing it will be understood that the valve unit includes numerous novel features of construction, having new and useful functions, and that all these cooperate to provide a new and useful water-softening system, all within the scope of the appended claims.

I claim:

1. A multiposition valve for a water softening system operable through a plurality of positions including a normal soften position, said valve including a casing having a hard water inlet, a consumption outlet, a drain outlet, and first and second tank passageways, means including a multiposition control means and a plurality of valve elements controlled thereby for selectively operating said valve to its normal soften position in which the inlet is connected to a first tank passageway, and means including time controlled auxiliary valve means selectively operable in said soften position for connecting a second of said tank passageways concurrently to said drain and consumption outlets and for gradually closing said drain outlet.

2. A multiposition valve for a water softening system operable through a plurality of positions including a normal soften position, said valve including a casing having a hard water inlet, a consumption outlet, a drain outlet, and first and second tank passageways, means including a multiposition control means and a plurality of valve elements controlled thereby for selectively operating said valve to a rinse position and to normal soften position in both of which positions the inlet is connected to a first tank passageway, and means including auxiliary valve means operable by said control means in said rinse position for connecting a second of said tank passageways to said drain outlet and operable in said normal soften position for connecting said second tank passageway concurrently to said drain and consumption outlets.

3. A multiposition valve for a water softening system operable through a plurality of positions including a normal soften position, said valve including a casing having a hard water inlet, a consumption outlet, a drain outlet, and first and second tank passageways, means including a multiposition control means and a plurality of valve elements controlled thereby for selectively operating said valve to a rinse position and to normal soften position in both of which positions the inlet is connected to the first tank passageway, means including auxiliary valve means operable by said control means in said rinse position for connecting a second of said tank passageways to said drain outlet and operable in said normal soften position for connecting said second tank passageway concurrently to said drain and consumption outlets, and time control means selectively operable in said normal soften position for controlling the auxiliary valve to close said drain outlet.

4. A multiposition valve for a water softening system operable through a plurality of positions including a normal soften position, said valve including a casing having a hard water inlet, a consumption outlet, a drain outlet, and first and second tank passageways, means including a multiposition control means and a plurality of valve elements controlled thereby for selectively operating said valve to a rinse position and to normal soften position in both of which positions the inlet is connected to a first tank passageway, said valve including a hard water bypass from the hard water inlet to the consumption outlet opened by said control means in the rinse position, auxiliary valve means for connecting a second of said tank passageways concurrently to said drain and consumption outlets, and means including time control means operable in both said rinse and normal soften positions for gradually moving said auxiliary valve to close said drain outlet.

5. A multiposition water softener valve, including in combination, a casing, a plurality of valve elements in said casing, multiposition control means for selectively operating said valve elements to condition the valve for softening and regeneration steps, and means including spring controlled time control means and a secondary spring biased valve controlled thereby for modifying one of the steps set up by said multiposition control means, said time control means including a rotatable cam and the spring biased valve having a spring acting on the cam to aid the time control means in rotating the cam.

References Cited in the file of this patent

UNITED STATES PATENTS

| | | |
|---|---|---|
| 1,652,845 | Vennum | Dec. 13, 1927 |
| 1,713,105 | Tannehill | May 14, 1929 |
| 1,764,155 | Daniels | June 17, 1930 |
| 1,873,306 | DeVille | Aug. 23, 1932 |
| 1,929,405 | Bilde | Oct. 10, 1933 |
| 2,012,194 | Hughes | Aug. 20, 1935 |

(Other references on following page)

UNITED STATES PATENTS

| | | |
|---|---|---|
| 2,292,801 | Slidel | Aug. 11, 1942 |
| 2,347,201 | Lindsay | Apr. 25, 1944 |
| 2,388,268 | Kromhout | Nov. 6, 1945 |
| 2,460,011 | Hungerford et al. | Jan. 25, 1949 |
| 2,462,154 | Barnes | Feb. 22, 1949 |
| 2,539,221 | Badeaux | Jan. 23, 1951 |
| 2,571,000 | Albertson | Oct. 9, 1951 |
| 2,598,362 | Daniels | May 27, 1952 |
| 2,610,945 | Purcell et al. | Sept. 16, 1952 |
| 2,662,549 | Rhinehart et al. | Dec. 15, 1953 |
| 2,738,807 | Addison | Mar. 20, 1956 |
| 2,743,739 | Mansen | May 1, 1956 |